United States Patent
DeGroot et al.

(10) Patent No.: US 7,045,110 B1
(45) Date of Patent: May 16, 2006

(54) HIGH YIELD CO-PRODUCTION OF ANHYDROUS HYDROGEN BROMIDE AND SODIUM BISULFATE

(75) Inventors: Richard J. DeGroot, Southfield, MI (US); Dov Shellef, Great Neck, NY (US)

(73) Assignee: Poly Systems USA, Inc., Great Neck, NY (US)

( * ) Notice: Subject to any disclaimer, the term of this patent is extended or adjusted under 35 U.S.C. 154(b) by 0 days.

(21) Appl. No.: 11/029,976

(22) Filed: Jan. 5, 2005

Related U.S. Application Data

(60) Provisional application No. 60/628,813, filed on Nov. 17, 2004.

(51) Int. Cl.
C01D 5/02 (2006.01)
C01B 7/09 (2006.01)

(52) U.S. Cl. ............... 423/520; 423/482; 423/488; 423/551

(58) Field of Classification Search ........... 423/520, 423/481, 482, 488, 551
See application file for complete search history.

(56) References Cited

U.S. PATENT DOCUMENTS

| | | | |
|---|---|---|---|
| 1,379,731 A | 5/1921 | Theimer | |
| 2,143,223 A | 1/1939 | Heath | 23/217 |
| 2,339,330 A * | 1/1944 | Gebhart | 252/193 |
| 2,359,221 A | 9/1944 | Kenaga | 23/216 |
| 2,705,670 A | 4/1955 | Chao | 23/154 |
| 2,762,689 A | 9/1956 | Giraitis et al. | 23/121 |
| 3,445,188 A * | 5/1969 | Heintz et al. | 423/482 |
| 4,045,543 A | 8/1977 | Sardisco | 423/482 |
| 4,371,512 A | 2/1983 | Sardisco et al. | 423/551 |
| 5,324,501 A | 6/1994 | Koehnk et al. | 423/555 |
| 6,692,716 B1 | 2/2004 | Phinney | 423/422 |
| 6,811,763 B1 * | 11/2004 | Bourgeois et al. | 423/482 |
| 2004/0067191 A1 | 4/2004 | Bourgeois et al. | 423/482 |
| 2004/0067192 A1 | 4/2004 | Kenneally et al. | 423/482 |
| 2005/0135990 A1 * | 6/2005 | Schaefer et al. | 423/482 |

* cited by examiner

Primary Examiner—Stanley S. Silverman
Assistant Examiner—Ardith E. Hertzog
(74) Attorney, Agent, or Firm—Michael W. Ferrell; Aaron L. Webb

(57) ABSTRACT

A batch process for co-producing anhydrous hydrogen bromide and a purified bisulfate salt comprising: (a) charging a batch reactor with a bromide salt slurry, wherein the slurry is more than 50% by weight bromide salt; (b) reacting the slurry with sulfuric acid in a batch reaction wherein bromide salt is consumed to produce crude aqueous hydrogen bromide and crude bisulfate salt, the crude bisulfate salt containing bromine; (c) prior to or concurrently with step (b) adding hydrogen bromide to the reactor; (d) purifying the crude hydrogen bromide to produce anhydrous hydrogen bromide; and (e) removing bromine from the crude bisulfate salt to form a purified bisulfate salt.

16 Claims, 1 Drawing Sheet

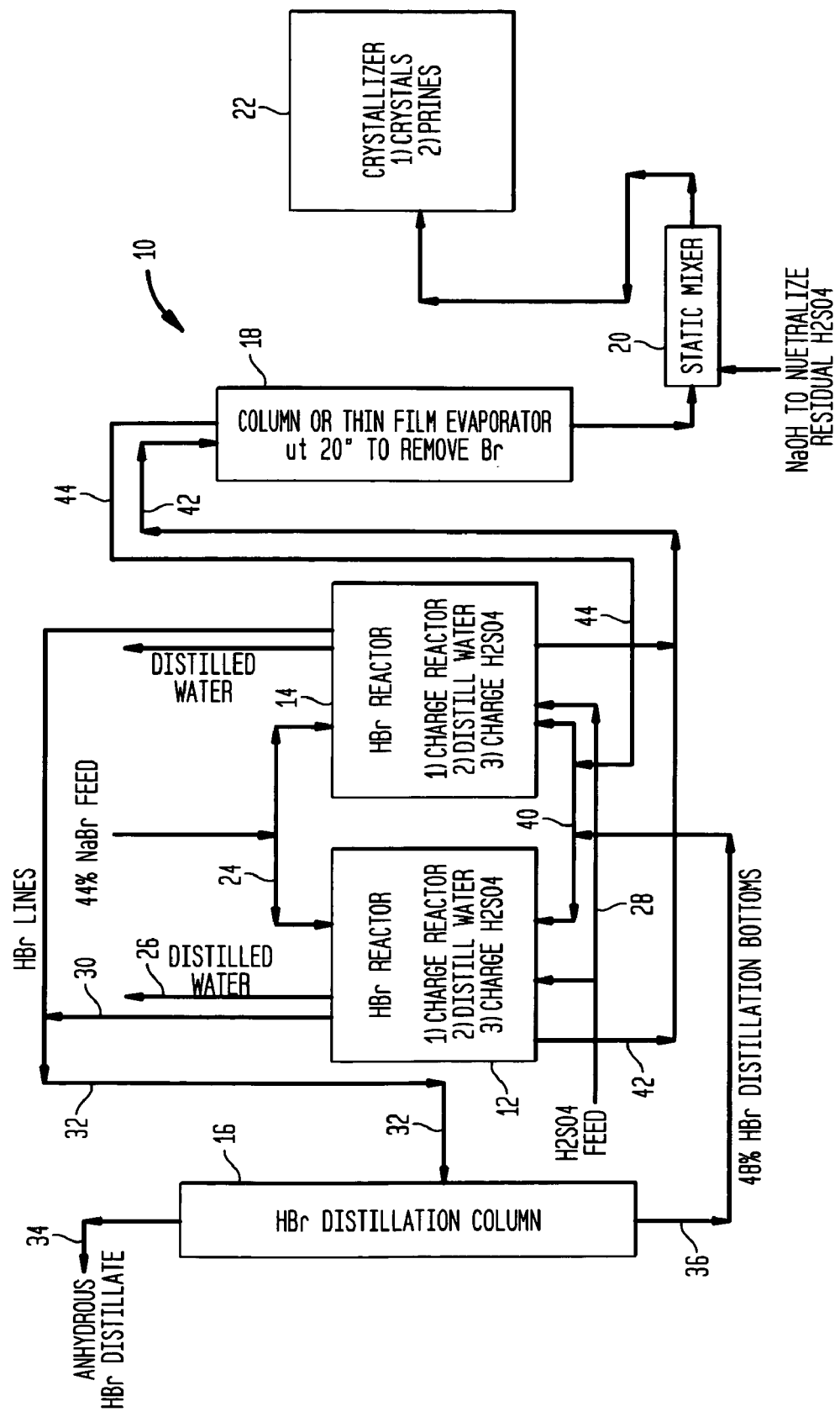

HIGH YIELD CO-PRODUCTION OF ANHYDROUS HYDROGEN BROMIDE AND SODIUM BISULFATE

CROSS-REFERENCE TO RELATED APPLICATIONS

This non-provisional patent application is based upon U.S. Provisional Patent Application No. 60/628,813, filed Nov. 17, 2004, entitled "Method For The Co-Production of Hydrogen Bromide and Low Bromide Sodium Bisulfate from Bromide Salts and Sulfuric Acid", the priority of which is hereby claimed.

FIELD OF THE INVENTION

The present invention is directed generally to the co-production of anhydrous hydrogen bromide and low bromide sodium bisulfate. More specifically, there is provided in accordance with the present invention a method of producing anhydrous hydrogen bromide and purified sodium bisulfate from a sodium bromide slurry and sulfuric acid.

BACKGROUND OF THE INVENTION

Anhydrous hydrogen bromide is widely used as an intermediate in the chemical industry. It is utilized in the production of inorganic bromides by reaction with metal hydroxides, oxides, or carbonates; in the production of organic bromides by reaction with alkyl alcohols or alkenes; and as a catalyst for oxidations, alkylations, and condensations in organic chemistry. Sodium bisulfate is likewise widely used in textiles and chemical processing and as a preservative.

The production of hydrogen bromide from sodium bromide is known. The reaction typically includes adding sulfuric acid to sodium bromide and water according to equation (I):

(I)

One drawback of known production methods for producing anhydrous hydrogen bromide is that a high boiling water/HBr azeotrope stream is produced. The azeotrope is difficult and expensive to purify as will be appreciated by one of skill in the art.

U.S. Pat. No. 1,379,731 to Theimer, describes a method to produce a stream of 48% HBr/water azeotrope of aqueous hydrogen bromide. This azeotropic solution has only limited commercial application due to the presence of the water. One approach to converting this azeotropic stream of 48% hydrogen bromide to anhydrous hydrogen bromide is to utilize pressure swing distillation where one column at high pressure will produce an aqueous stream of hydrogen bromide greater than 48%. A second column at lower pressure will produce a stream of hydrogen bromide with a concentration of less than 48%. Such a system will effectively break the azeotrope and produce an essentially anhydrous stream of hydrogen bromide; however pressure swing distillation requires the distillation of acidic aqueous streams under high pressure. This process will have high costs for two reasons. First, the process must be carried out in equipment design to withstand the high pressures and corrosive environment. Second, energy costs are high due to the high reflux ratios required to affect the distillation process as well as the high heats of evaporation of aqueous systems.

U.S. Pat. No. 2,705,670 to Chao also discloses a continuous process for producing HBr from sodium bromide; however, that continuous process produces excessive amounts of molecular bromine (Br$_2$) and sulfur dioxide; in contrast with the present invention which produces on the order of 300 ppm bromine based on HBr production. This is believed due to the fact that sulfuric acid reacts with HBr to form the undesirable products in accordance with equation II:

II when the salt is added to aqueous reactants as described in the reference. The '670 patent also contains what appear to be batchwise examples, but does not address handling of the HBr azeotrope or purification of bisulfate salt; features critical to the commercial usefulness of the present invention.

The need for a high-yield, environmentally friendly process to anhydrous hydrogen bromide utilizing salts is seen by the fact that large producers of bromide salt streams recycle them through bromine suppliers. For example, in St. Louis, Mo. a large chemical manufacturer produces 150 million pounds of a 44% NaBr solution. To convert this to a usable reagent they must ship it to Great Lakes Chemical in Eldorado, Ark. for reprocessing thru conventional chlorination routes (see U.S. Pat. Nos. 2,143,223 and 2,359,221).

The present invention is directed generally to an improved high-yield slurry process which produces both anhydrous hydrogen bromide and low-bromide bisulfate salt from a bromide salt source. Co-production of the two products minimizes waste and enables economical re-processing of bromide salt streams. Batchwise production allows for processing with a variety of starting materials and allows for re-processing of the azeotrope as will be seen in the examples appearing hereinafter.

SUMMARY OF THE INVENTION

It has been discovered thru the course of this work that the above problems can be alleviated by adding sulfuric acid to an aqueous slurry of sodium bromide. By concentrating a 44% solution of sodium bromide to a slurry of aqueous crystals the reaction is readily carried out. The fact that solid sodium bromide is present with small amounts of water affects three things.

1. It eliminates the formation of excessive amounts of bromine. Despite the fact that large amounts of solid sodium bromide are present the water inhibits the formation of bromine by dissolving the sulfuric acid before it can react with the solids;
2. It facilitates the handling of the solids. This is the case since chemical processing equipment is typically designed to handle slurries; and
3. The low water concentration allows for the production of hydrogen bromide at a concentration well above the azeotropic concentration of 48%.

There is provided in one aspect of the invention a batch process for co-producing anhydrous hydrogen bromide and a purified bisulfate salt comprising: (a) charging a batch reactor with a bromide salt slurry, wherein the slurry is more than 50% by weight bromide salt; (b) supplying hydrogen bromide to the reactor; (b) reacting the slurry with sulfuric acid in a batch reaction wherein bromide salt is consumed to produce crude aqueous hydrogen bromide and crude bisulfate salt, the crude bisulfate salt containing bromides; (d) purifying the crude hydrogen bromide to produce anhydrous hydrogen bromide; and (e) removing bromides from the crude bisulfate salt to form a purified bisulfate salt. In a preferred embodiment the bromide salt is sodium bromide and the bisulfate salt is sodium bisulfate. A convenient way to add the hydrogen bromide to the reactor is in the form of a water/HBr azeotrope or the hydrogen bromide charged to the reactor is derived from a water/HBr azeotrope.

Typically, the crude aqueous hydrogen bromide is purified by distillation and has less than 10,000 ppm water. In preferred embodiments, the purified hydrogen bromide has less than 1,000 ppm water. Still more preferably, the purified hydrogen bromide has less than 500 ppm water such as less than 100 ppm water.

Upon isolation, the crude bisulfate salt generally has less than 5 weight % bromide. To further purify the crude bisulfate, the crude bisulfate salt is acidified during purification and/or water is added to the bisulfate. Bromides are removed from the bisulfate salts by distillation through the utilization of the 48% water/HBr azeotrope. Preferably, the purified bisulfate salt has less than 1 weight percent bromide and still more preferably the purified bisulfate salt has less than 0.25 weight percent bromide such as when the purified bisulfate salt has less than 0.1 weight percent bromide.

A salt slurry charged to the reactor may consist essentially of sodium bisulfate-hydrate and sodium bromide charged to the reactor or sodium bromide and sodium sulfate-hydrate.

In cases where a water/HBr azeotrpoe is added to the sodium bromide slurry, hydrogen bromide is preferably charged to the reactor prior to reaction of the bromide salt with sulfuric acid.

In a batch process for producing anhydrous hydrogen bromide from a bromide salt and sulfuric acid, another aspect of the invention is the improvement comprising adding aqueous hydrogen bromide to a batch reactor prior to or concurrently with reaction of the bromide salt and sulfuric acid.

In a batch process for producing hydrogen bromide and a bisulfate salt from a bromide salt and sulfuric acid, still yet another aspect of the invention is the improvement comprising purifying the bisulfate salt of bromide such that the purified bisulfate salt has a bromide content of less than 1%; preferably the bisulfate salt has a bromide content of less than 0.5%.

BRIEF DESCRIPTION OF THE DRAWINGS

The process of the invention is illustrated and described in connection with the drawing which is a schematic diagram illustrating an alternating batch process of the invention.

DETAILED DESCRIPTION OF THE INVENTION

The invention is described in detail below in connection with particular features. Modifications within the spirit and scope of the present invention, set forth in the appended claims, will be readily apparent to those of skill in the art.

As previously explained, the production of anhydrous hydrogen bromide, from sodium bromide, is a well known process. The method comprises the addition of sulfuric acid to sodium bromide and water according to the process (I):

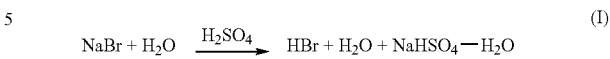

(I)

There is shown schematically in the drawing a suitable apparatus 10 for practicing the present invention. Apparatus 10 is an alternating batch apparatus with a first reactor 12 and a second reactor 14 as well as a drying column 16, a thin film evaporator 18, a mixer 20 and a crystallizer 22. While HBr production is batchwise, evaporator 18 and a drying column 16 may be operated continuously to provide purified bisulfate salt and anhydrous HBr.

In order to run the reaction, reactor 12 is first charged with sodium bromide salt (44%, aqueous) via line 24. Water is flashed off to lower the water content of the charge through line 26. Lines 24 and 26 are closed off and sulfuric acid, preferably highly concentrated (>95%) is added to reactor 12 via line 28; and the batchwise reaction of sodium bromide with sulfuric acid to produce crude HBr and crude bisulfate salt proceeds while product HBr is withdrawn from reactor 12 via line 30 and fed to drying column 16 via line 32.

Column 16 is a fractional distillation column which removes water from the crude product. Purified product is withdrawn at 34, wherein the anhydrous HBr has less than 1000 ppm water, preferably less than 100 ppm. The purified product can further be purified to remove bromine if so desired. A condensed 48% HBr/water azeotrope is withdrawn from column 16 at 36 and fed via line 40 to either reactor 12 or reactor 14. During batch processing of a bromide salt charge in reactor 12, it is preferable to feed the azeotrope to batch reactor 14.

When the reaction in reactor 12 is substantially complete, crude bisulfate salt is removed from reactor 12 via line 42 and fed to evaporator 18 where bromide is removed from the crude salt, preferably as the water/HBr azeotrope.

The purified salt is mixed at 20 and crystallized at 22, while the water/HBr is provided to either reactor 12 or reactor 14 via lines 44 and 40.

As the bromide salt is being reacted in reactor 12, reactor 14 is charged with another charge of bromide salt and preferably with an HBr/water zoetrope from column 16. The charge of reactor 14 is optionally dried while batch reactor 12 is providing HBr. When a batch reaction is completed in reactor 12, that reactor is closed off and sulfuric acid is fed to reactor 14, starting processing of the next batch of bromide salt. While batch reactor 14 is producing product, bisulfate salt is removed from reactor 12 and fed to evaporator 18. Water and/or sulfuric acid may be added to the crude bisulfate salt via line 28 to facilitate bromide separation as will be appreciated from specific examples provided hereinafter.

It will be appreciated from the foregoing that while successive batches of bromide salts are processed batchwise in reactors 12, 14, drying column 16 and evaporator 18 may be operated continuously, reducing capital costs for purification.

So also, hydrogen bromide either as high boiling azeotrope from drying column 16 or residual bromide in the crude bisulfate salt is recycled to the reactors, minimizing waste and maximizing yield.

Once the primary reaction between the sodium bromide and sulfuric acid has been completed a slight excess of sulfuric acid is typically added to the reaction bottoms. The excess of sulfuric acid assures that the bromide is present in the form of hydrogen bromide. The addition of water to the system in the form of steam or liquid water allows for the removal of this residual hydrogen bromide by distillation. This approach easily allows for the removal of bromides to less that 0.06% and predictably to less than 0.01%. Lower values can be obtained by additional volumes of water. The resulting bromide free bottoms are then dried and pelletized for sale as a commercial product.

The initial slurry of sodium bromide feed for this reaction can be made of:

1. Water and sodium bromide crystals;
2. 48% Hydrogen bromide and sodium bromide crystals;
3. Sodium bisulfate hydrate (mp 58 C) and sodium bromide crystals;
4. Sodium sulfate hydrate and sodium bromide crystals.
5. Various mixtures of the above components.

The invention is further illustrated in the Examples which follow.

EXAMPLE 1

Aqueous slurry with NaBr and water: A slurry of 258 gm sodium bromide and 58 gm water was prepared and added to a 500 ml round bottom flask. To this was added 238 gm of concentrated sulfuric acid over a period of 1.5 hours at a temperature of approximately 120° C. Upon addition of 15% of the sulfuric acid hydrogen bromide gas began to off gas and was collected in a water trap. The reaction bottoms were then heated 145° C. once all the sulfuric acid was added to drive off additional HBr.

The reaction effluents were as follows:
205 gm of HBr was collected and consisted of 90% HBr and 10% water.
334.3 gm of sodium bisulfate was collected and contained 4.0% Br—

EXAMPLE 2

An aqueous slurry of NaBr in 48% HBr: A slurry of 600 gm sodium bromide and 110 gm of 48% aqueous hydrogen bromide was prepared and added to a 1000 ml round bottom flask. To this was added 637 gm of concentrated sulfuric acid over a period of 1.5 hours. The initial temperature at the beginning of the acid addition was 70° C. and was ramped up to 140° C. at the end of the acid addition. Hydrogen bromide was generated immediately upon the addition of sulfuric acid and was collected in a water trap.

The reaction effluents were as follows:
526 gm of HBr was collected and consisted of 90% HBr and 10% water.
820 gm of sodium bisulfate was collected and contained 3.9% Br—.

EXAMPLE 3

An aqueous mixture of NaBr and NaHSO4—H2O: A slurry of 600 gm sodium bromide with 62 gm of 48% aqueous hydrogen bromide 59 gm NaHSO4 and 8 gm water was prepared and added to a 1000 ml round bottom flask. To this was added 638 gm of concentrated sulfuric acid over a period of 45 minutes. The temperature was held at 120° C. Hydrogen bromide was generated almost immediately upon the addition of sulfuric acid and was collected in a water trap.

The reaction effluents were as follows:
487 gm of HBr was collected and consisted of 98% HBr and 2% water.
887 gm of sodium bisulfate was collected.

EXAMPLE 4

Bromide reduction in NaHSO4: The sodium bisulfate-hydrate bottoms stream from example 2 was held at 140° C. and 10" of vacuum was applied for 10 minutes. The bromide level was reduced from 3.9% to 0.36%. The sodium bisulfate-hydrate melt began to solidify due to reduction in concentration of the hydrate (the hydrate melts at 58° C. and the non-hydrated sodium bisulfate melts at greater than 315° C. 50 gm of water was added to rehydrate the mixture and 20" of vacuum was again applied for 10 minutes. The bromide concentration was reduced from 0.36% to 0.061%.

EXAMPLE 5

Water Balance and Recycling NaHSO4 Consisting of Reactions 5A and 5B:

Reaction 5A

A slurry of 800.0 gm sodium bromide and 128.0 gm water was prepared and added to a 1000 ml round bottom flask. To this was added 840 gm of concentrated sulfuric acid over a period of 70 minutes at a temperature of approximately 130° C. Upon addition of 15% of the sulfuric acid hydrogen bromide gas was generated and passed thru a water condenser. The aqueous 48% HBr condensate was collected and the non-condensable HBr was collected in a water trap. The reaction bottoms were then heated to 145° C. after all the sulfuric acid was added to drive off additional HBr.

The reaction effluents were as follows:
478 gm of non-condensable HBr was collected and consisted of: 82% HBr, less than 300 ppm bromine and 18% water.
230 gm of condensed aqueous HBr was collected and consisted of: 58.6% HBr, 0.201% bromine, and 41.2% water.
1056 gm of sodium bisulfate (hydrate) was collected and contained 4.0% Br—.

Reaction 5B 857.2 gm of sodium bisulfate were removed from the reaction flask leaving 198.8 gm of sodium bisulfate (hydrate). To this were added 800 gm sodium bromide and the 230 gm of aqueous hydrogen bromide collected above. To this slurry was added 840 gm of concentrated sulfuric acid over a period of 60 minutes at a temperature of approximately 130° C. Hydrogen bromide gas was generated immediately upon the addition of the acid. The hydrogen bromide gas was passed thru a water condenser and the aqueous hydrogen bromide condensate was collected. The non-condensable HBr was collected in a water trap. The reaction bottoms were then heated to 145° C. to drive off additional HBr.

The reaction effluents were as follows:
689 gm of none condensable HBr was collected and consisted of: 99.9% HBr, less than 300 ppm bromides, and 0.1% water.
73 gm of condensed aqueous HBr was collected consisting of: 59.5% HBr, 0.352% bromides, and 40.1% water.
1303 gm of sodium bisulfate was collected and contained 4.0% Br—.

From this series of reactions it is evident that reacting NaBr in a slurry will allow for complete conversion of NaBr to HBr without a build up of the aqueous azeotropic hydrogen bromide. This is evident since the first reaction collected 230 gm of aqueous hydrogen bromide and the second collected only 73 gm.

It also shows that the reaction can successfully be carried out in a slurry of NaBr formed from the sodium bisulfate hydrate and aqueous hydrogen bromide. This will allow for the process to be carried out in an alternating batch reaction scheme which operates continuously, where one reactor will be used for acidification and a second for carrying out the steam distillation. Cycling between the two reactors will allow for a very efficient process.

EXAMPLE 6

Bromide Reduction in sodium bisulfate with water: To the 1303 gm of sodium bisulfate above was added 130 gm water and the mixture was distilled under a maximum of 14" of vacuum at a temperature of 141° C. (well above the HBr azeotrope temperature of 124° C. at atmospheric pressure). After removing 100 ml of water the bromides were reduced from 4.0% to 0.37%.

An additional 100 ml of water was added and the distillation above was repeated but under a maximum of 18.5" of vacuum at a temperature of 134° C. After removing an additional 100 ml of water the bromides were reduced from 0.37 to 0.12%.

An additional 50 ml of water was added and the distillation above was repeated but under a maximum of 20" of vacuum at 130° C. After removing an additional 90 ml of water, 50 mls that were added and 40 ml of water of hydration, the bromides were reduced from 0.12% to 0.03%.

Therefore, the use of water to remove bromides from sodium bisulfate is very effective. The process can be carried out as indicated above using liquid water. Once skilled in the art can adapt such a procedure to a continuous process using a column or using steam in place of water.

While the invention has been described in connection with several examples, modifications to these examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. A batch process for co-producing anhydrous hydrogen bromide and a purified bisulfate salt comprising:
   (a) charging a batch reactor with a bromide salt slurry, wherein the slurry is more than 50% by weight bromide salt;
   (b) adding hydrogen bromide to the reactor;
   (c) reacting the slurry with sulfuric acid in a batch reaction wherein bromide salt is consumed to produce crude aqueous hydrogen bromide and crude bisulfate salt, the crude bisulfate salt containing bromide;
   (d) purifying the crude hydrogen bromide by distillation to produce anhydrous hydrogen bromide; and
   (e) removing bromide from the crude bisulfate salt to form a purified bisulfate salt,
   wherein at least a portion of the hydrogen bromide that is added to the reactor is a product, or derived from a product, of: (i) the distillation of the crude hydrogen bromide; (ii) the purification of the crude bisulfate salt; (iii) or combinations thereof.

2. The process according to claim 1, wherein the bromide salt is sodium bromide and the bisulfate salt is sodium bisulfate.

3. The process according to claim 1, wherein the hydrogen bromide charged to the reactor is in the form of a water/HBr azeotrope.

4. The process according to claim 1, wherein the hydrogen bromide charged to the reactor is derived from a water/HBr azeotrope.

5. The process according to claim 1, wherein the purified hydrogen bromide has less than 10,000 ppm water.

6. The process according to claim 1, wherein the purified hydrogen bromide has less than 1,000 ppm water.

7. The process according to claim 1, wherein the purified hydrogen bromide has less than 100 ppm water.

8. The process according to claim 1, wherein the crude bisulfate salt has less than 5 weight % bromide.

9. The process according to claim 1, wherein the crude bisulfate salt is acidified for purification.

10. The process according to claim 1, wherein water is added to the bisulfate salt for purification.

11. The process according to claim 1, wherein the purified bisulfate salt has less than 1 weight percent bromide.

12. The process according to claim 1, wherein the purified bisulfate salt has less than 0.1 weight percent bromide.

13. The process according to claim 1, wherein sodium bisulfate hydrate is charged to the reactor.

14. The process according to claim 1, wherein sodium sulfate hydrate is charged to the reactor.

15. The process according to claim 1, wherein aqueous hydrogen bromide is charged to the reactor prior to reaction of the bromide salt with sulfuric acid.

16. The process according to claim 1, wherein the crude hydrogen bromide is purified by fractional distillation.

* * * * *